United States Patent
Wilt (10) Patent No.: US 6,826,311 B2
(45) Date of Patent: Nov. 30, 2004

(54) HOUGH TRANSFORM SUPPORTING METHODS AND ARRANGEMENTS

(75) Inventor: Nicholas P. Wilt, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 610 days.

(21) Appl. No.: 09/754,865

(22) Filed: Jan. 4, 2001

(65) Prior Publication Data

US 2002/0114518 A1 Aug. 22, 2002

(51) Int. Cl.⁷ .............................. G06K 9/36; G06K 9/46; G06T 1/00
(52) U.S. Cl. ..................... 382/281; 382/190; 382/199; 345/418
(58) Field of Search ................................ 382/199, 200, 382/276, 168, 181, 190, 192, 107, 205, 251, 266, 273, 279, 281, 306, 307; 345/619, 418, 419, 615, 441; 378/58

(56) References Cited

U.S. PATENT DOCUMENTS

| | | | | |
|---|---|---|---|---|
| 5,054,098 A | * | 10/1991 | Lee | 382/289 |
| 5,220,621 A | * | 6/1993 | Saitoh | 382/200 |
| 5,430,810 A | * | 7/1995 | Saeki | 382/281 |
| 5,801,970 A | * | 9/1998 | Rowland et al. | 703/6 |
| 5,864,779 A | * | 1/1999 | Fujimoto | 702/179 |
| 5,960,371 A | * | 9/1999 | Saito et al. | 702/11 |
| 6,111,993 A | * | 8/2000 | Matsunaga | 382/281 |
| 6,263,089 B1 | * | 7/2001 | Otsuka et al. | 382/107 |
| 6,496,187 B1 | * | 12/2002 | Deering et al. | 345/419 |

OTHER PUBLICATIONS

Hsiang–Ling Li and Chaitali Chakrabarti (Hardware Design of a 2–D Motion Estimation System based on the Hough Transform, IEEE 1998).*

* cited by examiner

Primary Examiner—Bhavesh M. Mehta
Assistant Examiner—Kanji Patel
(74) Attorney, Agent, or Firm—Lee & Hayes, PLLC (57) ABSTRACT

The Hough Transform is a computer vision algorithm that can robustly detect a wide variety of features such as lines, circles, and anything else that can be readily parameterized or otherwise cast in terms of a discrete popularity algorithm. Unfortunately, not all processors or like devices are capable of providing the requisite processing capability usually associated with the Hough Transform. The methods and arrangements presented herein leverage the dedicated hardware of a graphics card to provide a portion of the data processing. This is done by: in a pre-processing step, gathering observations that can be mapped into a parameter space of a desired feature or features; then, quantizing the parameter space of the desired feature(s); for each discrete quantized parameter combination, allocating a accumulator and initialize it to 0; for each observation, incrementing all of the accumulators that correspond to parameter combinations that might have produced the observation; and finding maxima in the quantized parameter array. This last step is a post-processing step that is completed by dedicated graphics hardware having an alpha-blending capability programmed to find maxima, i.e., record votes associated with the Hough Transform.

30 Claims, 6 Drawing Sheets

| X | Y | dX | dY | Mag | Ang | Rho |
|---|---|----|----|-----|-----|-----|
| 3 | 1 | 10 | 10 | 14.1 | 45.0 | 2.83 |
| 4 | 1 | 40 | 20 | 44.7 | 26.6 | 4.02 |
| 5 | 1 | 30 | 10 | 31.6 | 18.4 | 5.06 |
| 3 | 2 | 30 | 10 | 31.6 | 18.4 | 3.48 |
| 4 | 2 | 40 | 20 | 44.7 | 26.6 | 4.47 |
| 5 | 2 | 10 | 10 | 14.1 | 45.0 | 4.95 |
| 2 | 3 | 10 | 10 | 14.1 | 45.0 | 3.54 |
| 3 | 3 | 40 | 20 | 44.7 | 26.6 | 4.02 |
| 4 | 3 | 30 | 10 | 31.6 | 18.4 | 4.74 |
| 2 | 4 | 30 | 10 | 31.6 | 18.4 | 3.16 |
| 3 | 4 | 40 | 20 | 44.7 | 26.6 | 4.47 |
| 4 | 4 | 10 | 10 | 14.1 | 45.0 | 5.66 |
| 1 | 5 | 10 | 10 | 14.1 | 45.0 | 4.24 |
| 2 | 5 | 40 | 20 | 44.7 | 26.6 | 4.02 |
| 3 | 5 | 30 | 10 | 31.6 | 18.4 | 4.43 |
| 1 | 6 | 30 | 10 | 31.6 | 18.4 | 2.85 |
| 2 | 6 | 40 | 20 | 44.7 | 26.6 | 4.47 |
| 3 | 6 | 10 | 10 | 14.1 | 45.0 | 6.36 |
| 1 | 7 | 40 | 20 | 44.7 | 26.6 | 4.02 |
| 2 | 7 | 30 | 10 | 31.6 | 18.4 | 4.11 |
| 1 | 8 | 40 | 20 | 44.7 | 26.6 | 4.47 |
| 2 | 8 | 10 | 10 | 14.1 | 45.0 | 7.07 |

| Theta | Rho 2-2.5 | 2.5-3 | 3-3.5 | 3.5-4 | 4-4.5 | 4.5-5 | 5-5.5 | 5.5-6 | 6-6.5 | 6.5-7 | 7-7.5 | 7.5-8 |
|---|---|---|---|---|---|---|---|---|---|---|---|---|
| 0-5 | | | | | | | | | | | | |
| 5-10 | | | | | | | | | | | | |
| 10-15 | | | | | | | | | | | | |
| 15-20 | | 1 | 2 | | 2 | 1 | 1 | | | | | |
| 20-25 | | | | | | | | | | | | |
| 25-30 | | | | 8 | | | | | | | | |
| 30-35 | | | | | | | | | | | | |
| 35-40 | | | | | | | | | | | | |
| 40-45 | | 1 | | 1 | 1 | 1 | | 1 | 1 | | 1 | |

HOUGH TRANSFORM SUPPORTING METHODS AND ARRANGEMENTS

TECHNICAL FIELD

The present invention relates in general to object detection and tracking, and more particularly to a methods and arrangements for use in detecting visible features using a Hough Transform.

BACKGROUND

Applications for automatic digital object detection and tracking, image registration, pattern recognition and computer vision analysis are becoming increasingly important for providing new classes of services to users based on assessments of the object's presence, position, trajectory, etc. These assessments allow advanced and accurate digital analysis (such as pattern recognition, motion analysis, etc.) of the objects in a scene, for example, objects in a sequence of images of a video scene. Plural objects define each image and are typically nebulous collections of pixels, which satisfy some property.

These pixels are often the result of some logical operation, such as, e.g., filtering, equalization, edge or feature detection, that is applied to the raw input image data. Hence, objects typically occupy one or more regions within each image. In a video scene, these objects may change their relative position in subsequent images or frames depicting the video scene. These objects are considered moving objects, which form motion within a video scene and can be automatically detected and tracked with various techniques.

The Hough Transform is a well-known computer vision algorithm that can be implemented to robustly detect a wide variety of features such as lines, circles, and anything else that can be readily parameterized or otherwise cast in terms of a discrete popularity algorithm. Unfortunately, the Hough transform tends to be computationally intensive. Many personal computer (PC) microprocessors are unable to provide the requisite processing capability usually associated with the Hough Transform. This is more true for video that often requires frame rates of about twenty frames or more per second, novel user interfaces using computer vision such as the puppeteering of avatars in online scenarios (e.g., during massively multiplayer games, virtual teleconferencing, and the like), and feature extraction for subsequent image processing (e.g., image registration).

Thus, to support such capabilities there is a need for improved methods and arrangements that support the use of Hough transforms, and/or any similar transform. Preferably, the improved methods and arrangements will be suitable for implementation in a PC or like device, and/or otherwise realizable in a cost effective package.

SUMMARY

The above stated needs and other are met by various improved methods and arrangements that, in accordance with certain aspects of the present invention, leverage the dedicated hardware of a graphics circuit (e.g., a 3D graphics accelerator card, etc.) to provide a portion of the data processing associated with the Hough transform.

This may be accomplished, for example, by gathering observations that can be mapped into a parameter space of a desired feature or features, quantizing the parameter space of the desired feature(s), and allocating an accumulator and initializing it to zero for each discrete quantized parameter combination. Then, for each observation incrementing all of the accumulators that correspond to parameter combinations that might have produced the observation, and finding maxima in the quantized parameter array.

Per the various methods and arrangements provided herein, these basic processes are selectively performed by a general-purpose processor along with the dedicated hardware of the graphics circuit. By way of example, in certain implementations the dedicated graphics hardware provides an alpha-blending capability that can be leveraged to record votes associated with the Hough Transform.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

One of the problems with past implementations of the Hough transform is that the arrays of accumulators needed for Hough transforms have historically needed to be low-resolution because of the data storage expense and execution time requirements for higher resolution arrays. This is because, high-resolution arrays require both more time to manage, and more time to analyze after the algorithm has finished processing the accumulators.

As described below, the various methods and arrangements describe ways to leverage dedicated hardware to solve these problems. As will be shown, it is feasible to use an inexpensive processor that can operate on ordered data to implement the Hough transform. A preliminary/sample implementation of the technique has been implemented on a circa 1998 graphics card. As described in more detail below, in these methods and arrangements, the pixel values within a frame buffer are essentially thought of as accumulators. The methods and arrangements can then use the texture mapping and alpha blending functionality to increment the appropriate accumulators as the Hough algorithm progresses. The following detailed description and accompanying drawings also describe ways to address some limitations in this specific implementation, such as low precision and the inability to use the graphics processor to analyze the output images.

Computing Environment

Figure 1:
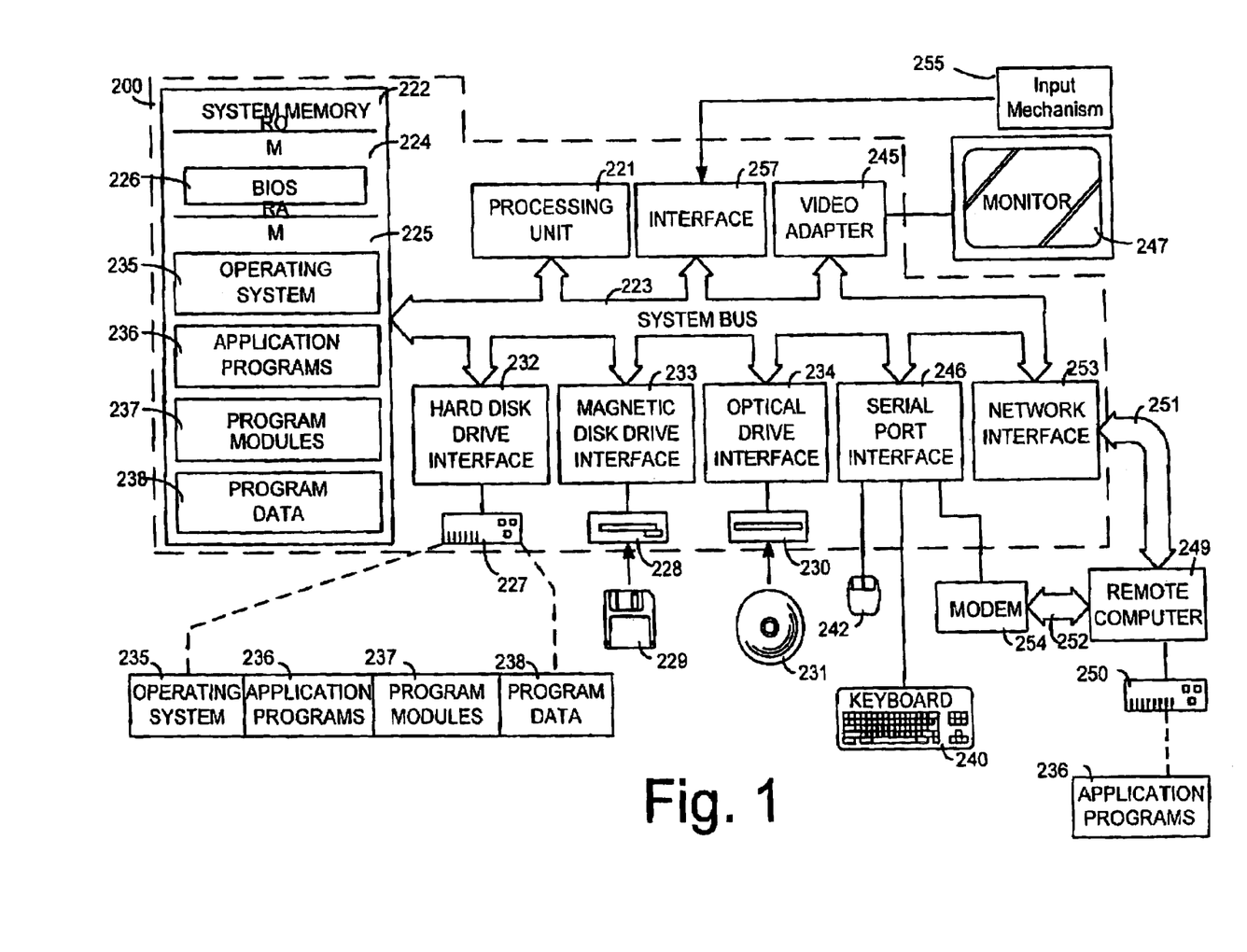
FIG. 1 is a block diagram depicting an exemplary computer system that is suitable for use with the following invention.

Reference is now made to FIG. 1, which is a block diagram of an exemplary computing system 200 suitable for use with the various methods and arrangements in accordance with the present invention.

Computing system 200 is, in this example, a personal computer (PC), however, in other examples computing system may take the form of a special-purpose device, an appliance, a handheld computing device, a cellular telephone device, a pager device, etc.

As shown, computing system 200 includes a processing unit 221, a system memory 222, and a system bus 223. System bus 223 links together various system components including system memory 222 and the processing unit 221. System bus 223 may be any of several types of bus structures including a memory bus or memory controller, a peripheral bus, and a local bus using any of a variety of bus architectures. System memory 222 typically includes read only memory (ROM) 224 and random access memory (RAM) 225. A basic input/output system 226 (BIOS), containing the basic routine that helps to transfer information between elements within computing system 200, such as during start-up, is stored in ROM 224. Computing system 200 further includes a hard disk drive 227 for reading from and writing to a hard disk, not shown, a magnetic disk drive 228 for reading from or writing to a removable magnetic disk 229, and an optical disk drive 30 for reading from or writing to a removable optical disk 231 such as a CD ROM or other optical media. Hard disk drive 227, magnetic disk drive 228, and optical disk drive 230 are connected to system bus 223 by a hard disk drive interface 232, a magnetic disk drive interface 233, and an optical drive interface 234, respectively. These drives and their associated computer-readable media provide nonvolatile storage of computer readable instructions, data structures, computer programs and other data for computing system 200.

A number of computer programs may be stored on the hard disk, magnetic disk 229, optical disk 231, ROM 224 or RAM 225, including an operating system 235, one or more application programs 236, other programs 237, and program data 238.

A user may enter commands and information into computing system 200 through various input devices such as a keyboard 240 and pointing device 242 (such as a mouse). Of particular significance to the present invention, a camera 255 (such as a digital/electronic still or video camera, or film/photographic scanner) capable of capturing a sequence of images 256 can also be included as an input device to computing system 200. The images 256 are input into computing system 200 via an appropriate camera interface 257. This interface 257 is connected to the system bus 223, thereby allowing image data to be stored in RAM 225, or one of the other data storage devices. It is noted, however, that image data, such as COM data, can be input into computing system 200 from any of the aforementioned computer-readable media as well, without requiring the use of the camera 255.

As shown, a monitor 247 or other type of display device is also connected to the system bus 223 via an interface, such as a video adapter 245. In addition to the monitor, computing system 200 may also include other peripheral output devices (not shown), such as speakers, printers, etc.

Computing system 200 may operate in a networked environment using logical connections to one or more remote computers, such as a remote computer 249. Remote computer 249 may be another personal computer, a server, a router, a network PC, a peer device or other common network node, and typically includes many or all of the elements described above relative to computing system 200, although only a memory storage device 250 has been illustrated in FIG. 2.

Figure 2:
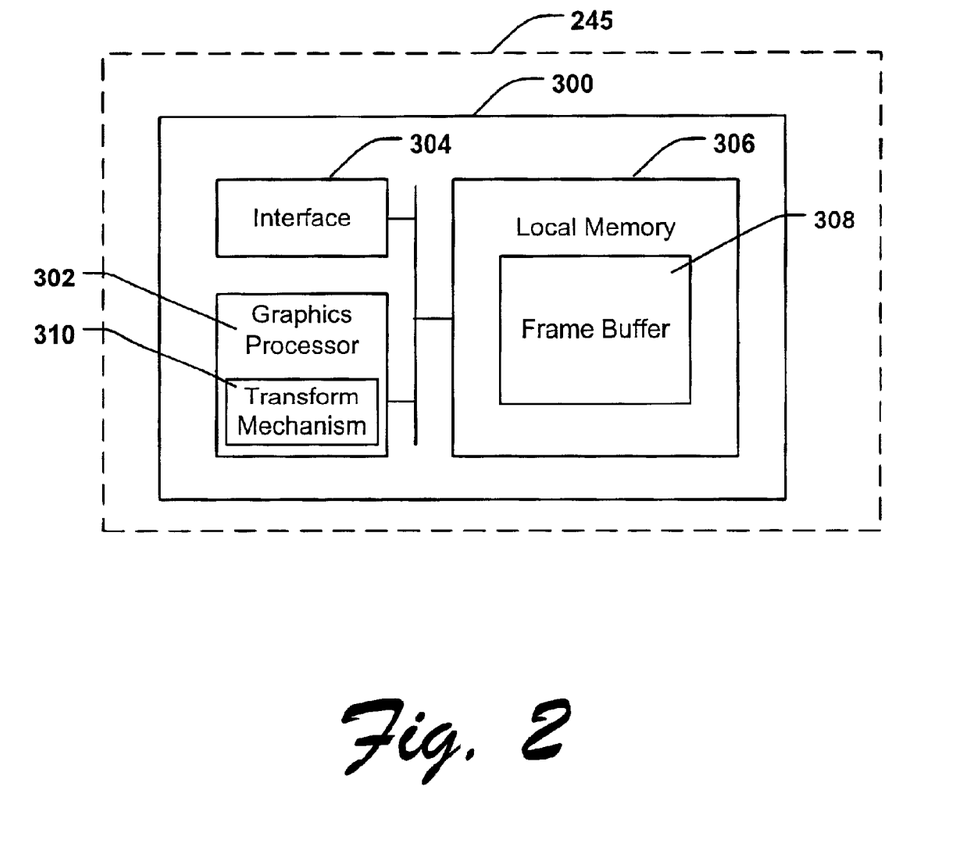
FIG. 2 is a block diagram of a portion of an exemplary graphics circuit suitable for use in the computer system of FIG. 1.

The logical connections depicted in FIG. 2 include a local area network (LAN) 251 and a wide area network (WAN) 252. Such networking environments are commonplace in offices, enterprise-wide computer networks, Intranets and the Internet.

When used in a LAN networking environment, computing system 200 is connected to the local network 251 through a network interface or adapter 253. When used in a WAN networking environment, computing system 200 typically includes a modem 254 or other means for establishing communications over the wide area network 252, such as the Internet. Modem 254, which may be internal or external, is connected to system bus 223 via the serial port interface 246.

In a networked environment, computer programs depicted relative to the computing system 200, or portions thereof, may be stored in the remote memory storage device. It will be appreciated that the network connections shown are exemplary and other means of establishing a communications link between the computers may be used.

Exemplary Graphics Hardware

FIG. 2 depicts a portion 300 of an exemplary video adapter card 245, having a graphics processor 302 that is operatively coupled to interface 304 and local memory 306. As illustratively shown, graphics processor 302 includes a transform mechanism 310 that is capable of performing one or more transform functions using information provided in local memory 306. In this manner, graphics processor 302 is able to process graphics information associated with a frame buffer 308. Interface 304 provides an interface for other circuits to graphics processor 302 and local memory 306. As such, processing unit 221 is able to provide inputs to graphics processor 302 and access local memory 306, or otherwise receive outputs there from, via interface 304.

Most PCs have a graphics processor with significant processing capabilities. For example, it is not uncommon for a PC to have a graphics processor that can process a couple hundred million values in an ordered array each second. One example is NVIDIA's Quadro2 MXR, which can process 25 million triangles per second and 400 million pixels per second. These powerful graphics processors are typically coupled to a significantly large and fast local memory, e.g., 32 Mbytes, 64 Mbytes, 128 Mbytes, of SDRAM.

Exemplary Applications of the Hough Transform

The Hough transform employs a well-known algorithm that can robustly detect features by constructing and analyzing a data structure using a number of distinct observations.

The feature to be detected must be parameterizable, such as a line that can be described as the parameters $(\theta, \rho)$ in the equation $\rho = x \cos \theta + y \sin \theta$. In addition, it is necessary to be able to identify all parameter sets corresponding to the features in which a given observation could participate.

Once these criteria have been fulfilled, the feature detection is implemented using a bin counting algorithm. The parameters are quantized and for each discrete combination of parameters, an accumulator is allocated and initialized to zero. Then, for each observation, the accumulators corresponding to every set of parameters that satisfies the equation for that observation are selectively incremented.

Figure 3:
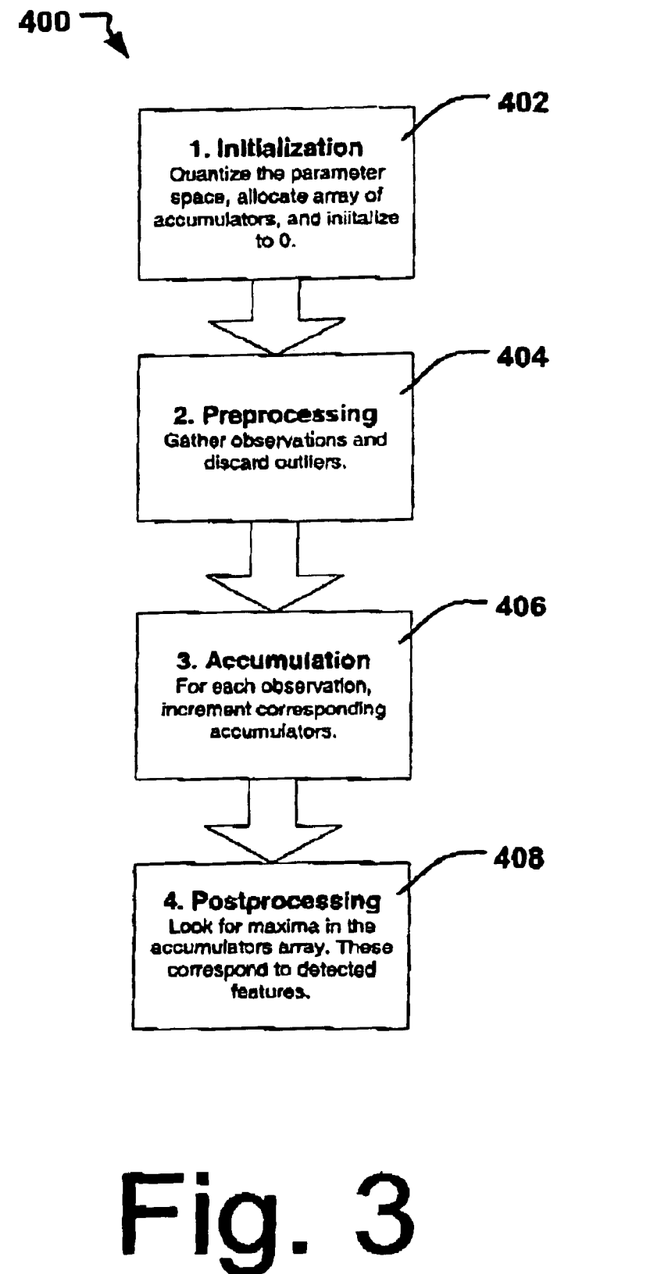
FIG. 3 is a flowchart depicting an exemplary process for performing a Hough transform using the circuits and devices in FIGS. 1–2.

Attention is now drawn to FIG. 3. As depicted in FIG. 3, an exemplary algorithm proceeds as follows. In initialization step 402 a portion of the parameter space that may contain a desired feature(s) is quantized and, for each discrete quantized parameter combination an accumulator is allocated and set to zero (0).

In preprocessing step 404, observations that can be mapped into the parameter space of the desired feature(s) are gathered. Next, in accumulation step 406, for each observation, all of the accumulators that correspond to parameter combinations that might have produced the observation are incremented.

In post processing step 408, the maxima in the quantized parameter array is found and the parameter combinations whose elements are maximum correspond to features detected by the set of observations gathered in step 402.

An example of basic process 400 in FIG. 3 will now be described. The following example is for purposes of illustration only. Many of the details of this example, including the type of feature being detected, the input format, the type of observation used to detect the feature, the edge detection operator, the method of gathering and selecting the observations that will participate in the accumulation process, and the resolution of the parameter quantization may vary from what is described below in practice.

This example will illustrate edge detection in an image using the Hough algorithm as provided in FIG. 3. The input is an image of grayscale pixel values; the output is the line equation of the detected edge, using the parametric equation $\rho = x \cos \theta + y \sin \theta$ for the line. The observations used to detect the edge are locations $(x_0, y_0)$ and differences $(\Delta x, \Delta y)$ reported by a convolution-based gradient detection algorithm. The locations and differences may be mapped into the parameter space $(\theta, \rho)$ using the following equation:

$$\theta = \tan^{-1} \frac{\Delta y}{\Delta x}$$

$$\rho = x_0 \cos \theta + y_0 \sin \theta$$

For each observation, the accumulator corresponding to the $(\theta, \rho)$ pair is incremented. After each observation has been recorded, the accumulators are searched for maxima. The accumulators with large values correspond to lines detected by the observations.

Figure 4:
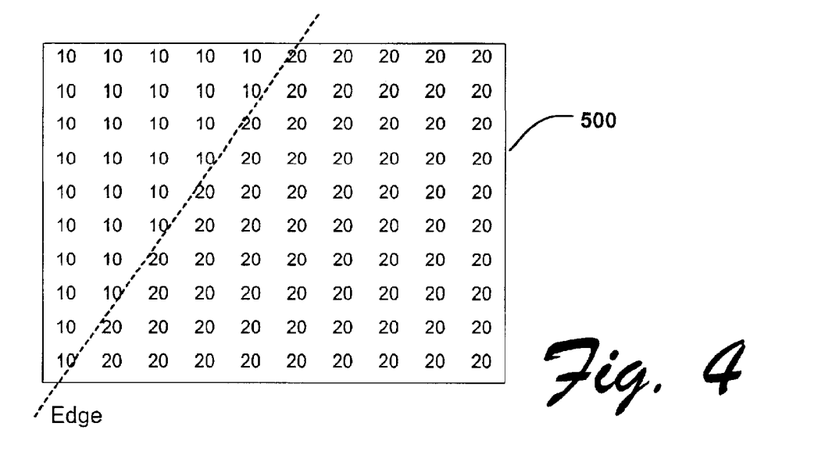
FIGS. 4–8 are data tables illustrating an exemplary Hough transform process associated with the flowchart in FIG. 3

An exemplary 10×10 matrix 500 of pixel values that contain an edge is depicted in FIG. 4.

Figure 5:
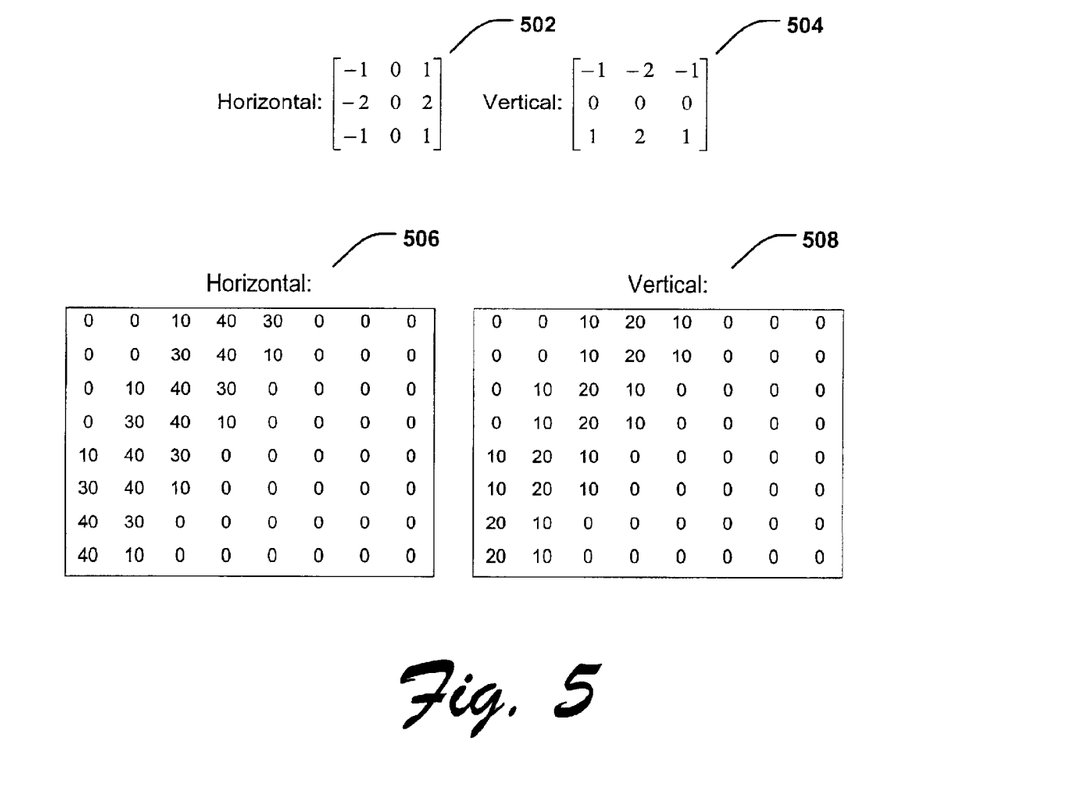

Next, as depicted in FIG. 5, matrix 500 is transformed for edge detection using horizontal and vertical 3×3 Sobel operators, 502 and 504, respectively. This results in a corresponding 8×8 horizontal matrix 506 and 8×8 vertical matrix 508, wherein the resulting Sobel value operator values near the edge are larger.

Figure 6:
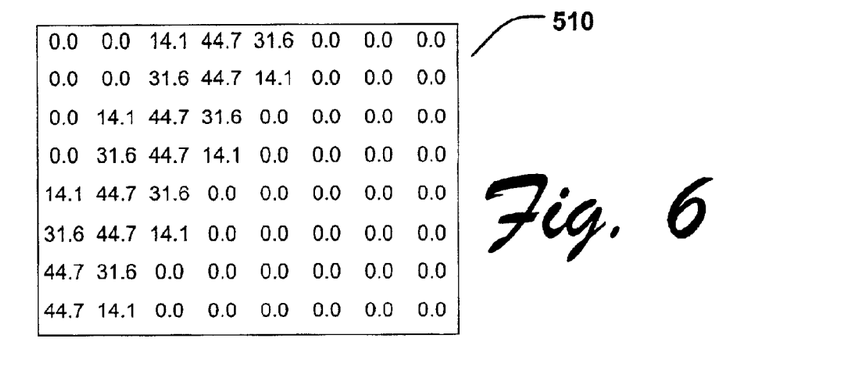
Figure 7:
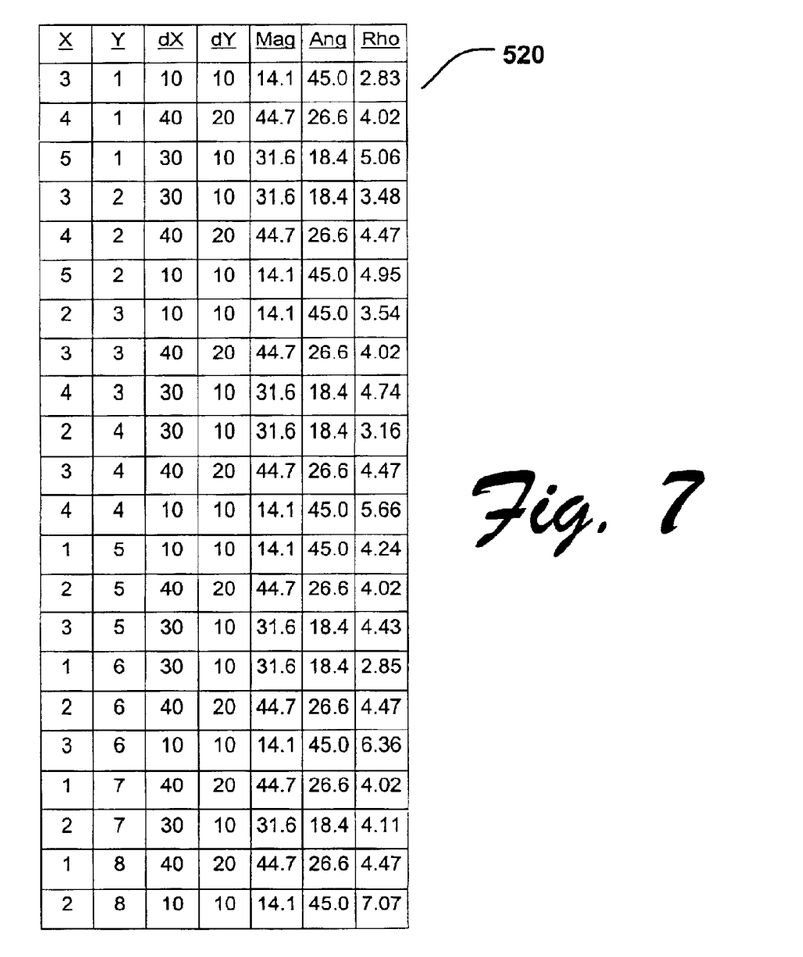

Next, as depicted in the FIG. 6, an 8×8 matrix 510 is determined by taking the magnitude $\sqrt{H^2 + V^2}$ of the Sobel operators.

Table 520 in FIG. 6, lists the observations, i.e., locations where the Sobel operator reported a magnitude greater than zero.

Figure 8:
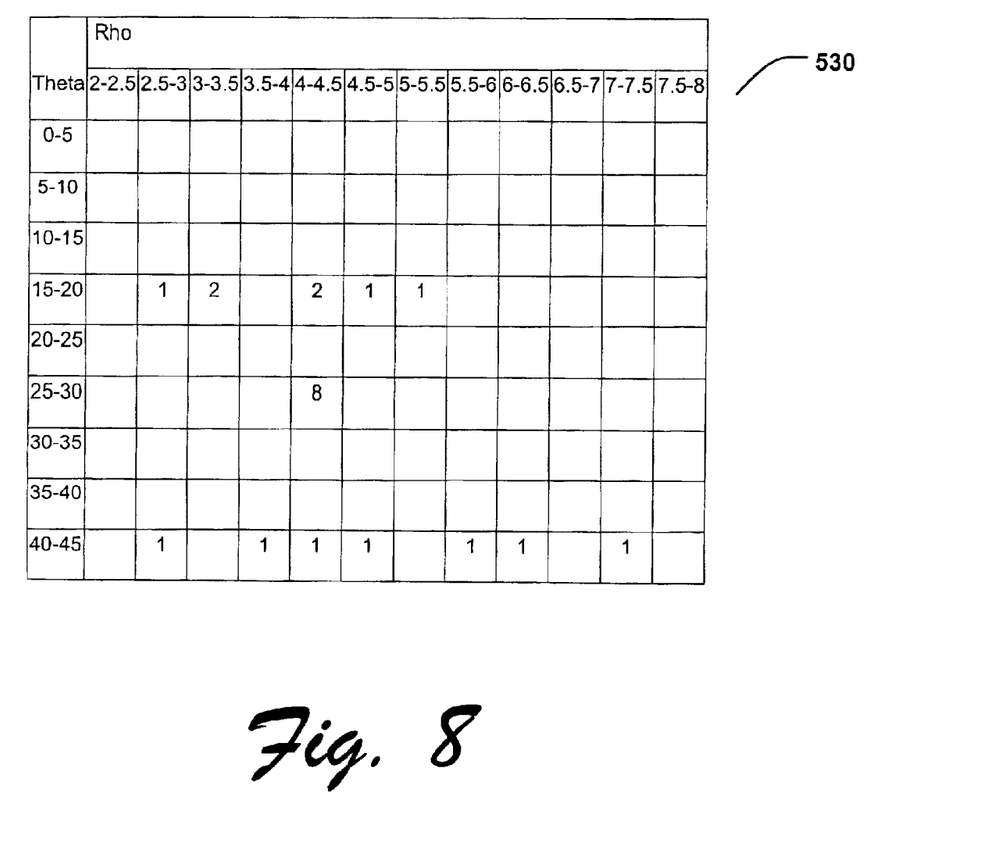

Next, as depicted in FIG. 8, in an array 530 of accumulators (i.e., a voting buffer) corresponding to $(f, \rho)$ pairs is allocated and initialized to 0. For purposes of this example, $\theta$ is quantized in the range [0, 45] in increments of 5 degrees and p is quantized from 2 to 8 in half-point increments. The resulting array 530 is depicted with zeros left blank. As can be seen, the maximum value in array 530 is 8, wherein $25 \leq \theta \leq 30$ and $4 \leq \rho \leq 4.5$. Consequently, this result gives a strong and accurate indication of where the edge is in the image (see FIG. 4).

The true power of the Hough transform comes to light when the observations are noisy, and when limited information is available about them.

If the observations are noisy, spurious observations have a negligible impact on the overall bin counting. In the above example, spurious observations that caused up to 7 votes to be tallied in an incorrect accumulator would still yield a correct result.

If limited information is available about the observations, the bins corresponding to all possible features that could explain the observation could be incremented. Using the previous example, if the algorithm reports only locations and not angles, then the Hough algorithm can increment the accumulators corresponding to all lines that intersect a given location. Maxima in the resulting accumulator array 530 would still identify lines in the image robustly.

The Hough algorithm can also detect features that are not lines. Circles, for example, may be parameterized as $(x_0, y_0, \rho)$ in the equation $(x-x_0)^2 + (y-y_0)^2 = \rho^2$ where $(x_0, y_0)$ are the center of the circle and $\rho$ is the radius. A 3D array of accumulators may be used to search for circles with different radii, or a 2D array of accumulators could be used if the radius is known.

The Hough algorithm can also be applied to robust template matching ("generalized Hough"). One possible method for doing so is to pick a reference point on the template object and compute a series of gradients along the boundary. For each gradient, the angle and distance from the reference point is stored. The array of accumulators in accumulation step 406 of the algorithm corresponds to the possible locations of the object being searched for. The observations in step 404 give gradients and locations that can be used in conjunction with the angles and distances of the gradients to 'vote' for the possible locations of the reference point of the template. When the voting is complete, the accumulator with the highest value corresponds to the location of the feature.

Certain advantages of the invention extend to the above-described implementation of generalized Hough, and improvements of the algorithm such as taking the gradient strength into account when determining which accumulators to increment.

The size of a naively allocated array of accumulators increases exponentially in the number of parameters. One way to reduce the number of elements in this array is to allocate them lazily, deferring the allocation of the memory needed for a given accumulator until that accumulator must be incremented. This approach makes sense if the observations map into a sparse set of the accumulators that encompass the quantized parameter space. This technique may be applied to the Invention by lazily allocating arrays for the algorithm to operate on.

Another extension of the naive Hough algorithm described above is to apply a more sophisticated operation to the accumulator than a simple increment. Here, for example, one could take the observation error into account when incrementing the accumulator. Hence, a tent function is added to the accumulators that correspond to the features that could produce the observation. Larger values are applied to accumulators that are more likely to have produced the observation; the falloff of the tent function should reflect the error characteristics of the observation in question.

To make this work, it is best to arrange the array of accumulator so the accumulators for related parameters may be treated as contiguous. Discontinuities such as the $-\pi/\pi$ discontinuity in angular measurements can be worked around with addressing calculations.

With the previous sections in mind, it has been found that a 3D accelerator may be used to accelerate the incrementing of the appropriate accumulators when running the Hough algorithm. An overview of the algorithm as implemented on a 3D accelerator is as follows.

Preprocessing step 402: gather observations that can be mapped into the parameter space of the desired feature(s).

This step may be performed with the aid of graphics processor 302, provided it supports the needed operations. For example, if graphics processor 302 can perform convolution and report the results back to processor 221 (or report locations and convolution values where the operator exceeds a specified threshold), then processor 221 would not have to perform any pixel processing to gather the observations.

Initialization step 404: quantize the parameter space of the desired feature(s) and, for each discrete quantized parameter combination, allocate an accumulator and initialize it to 0.

This step entails allocating frame buffer 308 to contain the accumulators. Each surface contains a 2D slice of quantized parameter space; if 3 or more dimensions are being accumulated, the third and higher dimensions can be quantized into an array of discrete frame buffer surfaces.

Accumulation step 406: for each observation, increment all of the accumulators that correspond to parameter combinations that might have produced the observation.

This step may be implemented using alpha blended triangles. The alpha blending stage replaces each output pixel with Src*$\alpha_{rcs}$+Dest*$\alpha_{dest}$, where Src is the source fragment; Dest is the pixel in the frame buffer location; and $\alpha_s$ and $\alpha_d$ are application-specified alpha factors that may originate from the fragment, the interpolants, or the frame buffer.

For simple addition, $\alpha_s$ and $\alpha_d$ may be set to 1. The vertices of the triangles may be used to control the intensity of the value being added. A texture may be used as a lookup table to add an arbitrarily complex function, such as a Gaussian curve, or the like, approximating the error of the observation, over the accumulators in the frame buffer 308.

Numerous triangles can describe an arbitrarily complex function to apply to the arrays of accumulators. For arrays of accumulators of 3 or more dimensions, triangles could be used to apply the tent function over a 3D volume of accumulators in the array of surfaces.

For large numbers of observations, precision in frame buffer 308 may become an issue. The saturated arithmetic performed when alpha blending serves us in good stead when this happens—values that are already maximum stay at the maximum. If contiguous regions become saturated in the frame buffer arrays, the post processing phase must look for the centroids of regions of maximum values.

Post processing step 408: find maxima in the quantized parameter array. The parameter combinations whose elements are maximum correspond to features detected by the set of observations gathered in Step 1.

As with Step 402, step 408 may be accelerated if the graphics processor contains logic that can aid with feature detection of the pixel data. For example, hardware-accelerated histogram computation could be used to implement a hardware-accelerated O(lgN) search for maxima in the output images.

Moreover, graphics hardware that can operate on multiple channels simultaneously and in parallel enables parallel processing of parameter accumulation. For example, each element in the accumulator array could contain some number of elements that could be incremented by different amounts (including zero) on an individual basis. A single array could then contain accumulators for different types of features, or a single frame buffer could contain multiple levels of a quantized 3D parameterization. More specifically, with respect to 3D graphics hardware, using the color channels in the frame buffer allows different accumulators to coexist in the same frame buffer. The vertex colors and modulation and texture blending hardware interact to control how the individual components are incremented.

The Hough transform techniques taught herein also benefit from higher precision in the accumulators. As the number of observations grows, the probability increases that elements in the accumulator arrays will be saturated, thereby reducing the accuracy of the detection. More specifically, with respect to 3D graphics hardware, increasing the precision of color components beyond 8 bits per pixel would result in a corresponding and advantageous increase in precision of the detection.

Furthermore still, for hardware that can treat the accumulators as inputs, the technique may be applied recursively to the output of a previous pass of the algorithm. Obviously the features detected by a later pass need not be the same or even remotely related to the features detected earlier.

Although some preferred implementations of various methods and arrangements have been illustrated in the accompanying Drawings and described in the foregoing Description, it will be understood that the invention is not limited to the exemplary implementations disclosed, but is capable of numerous rearrangements, modifications and substitutions as set forth and defined by the following claims.

What is claimed is:

1. A method comprising:

providing image data; and performing a Hough transform on the image data using a host processor and an operatively configured graphics processor, wherein the graphics processor performs an alpha-blending operation that selectively increments accumulators that correspond to parameter combinations that are likely associated with an observation.

2. The method as recited in claim 1, wherein the graphics processor is configured to count votes in a resulting Hough transform voting buffer.

3. The method as recited in claim 1, wherein the graphics processor is configured to convolve image values and provide corresponding results to the host processor.

4. The method as recited in claim 1, wherein the graphics processor performs a histogram computation to find a maxima value in a Hough transform voting buffer.

5. The method as recited in claim 1 wherein the performing operation comprises template matching.

6. The method as recited in claim 1 wherein the alpha-blending operation adds a tent function to the accumulators, the tent function characterizing errors associated with the observation.

7. The method as recited in claim 1 wherein the alpha-blending operation adds a Gaussian function to the accumulators, the Gaussian function characterizing errors associated with the observation.

8. The method as recited in claim 1 wherein the graphics processor performs the alpha-blending operation on multiple channels in parallel.

9. The method as recited in claim 1 wherein the graphics processor comprises a 3-Dimensional accelerator.

10. The method as recited in claim 1 wherein the accumulators are arranged in an array wherein related parameters are contiguous.

11. An apparatus comprising:

a host processor configured to provide image data;

a graphics processor operatively coupled to the host processor and configured to perform selected steps of a Hough transform algorithm on the image data in association with the host processor; and a local memory operatively coupled to the graphics processor, wherein the graphics processor performs an alpha-blending operation that selectively increments accumulators within the local memory that correspond to parameter combinations that are likely associated with an observation.

12. The apparatus as recited in claim 11, wherein the graphics processor is configured to count votes in a resulting Hough transform voting buffer within the local memory.

13. The apparatus as recited in claim 11, wherein the graphics processor is configured to convolve image values and provide corresponding results to the host processor.

14. The apparatus as recited in claim 11, wherein the graphics processor performs a histogram computation to find a maxima value in a Hough transform voting buffer within the local memory.

15. The apparatus as recited in claim 11 wherein the graphics processor is configured to perform template matching.

16. The apparatus as recited in claim 11 wherein the alpha-blending operation adds a tent function to the accumulators, the tent function characterizing errors associated with the observation.

17. The apparatus as recited in claim 11 wherein the alpha-blending operation adds a Gaussian function to the accumulators, the Gaussian function characterizing errors associated with the observation.

18. The apparatus as recited in claim 11 wherein the graphics processor performs the alpha-blending operation on multiple channels in parallel.

19. The apparatus as recited in claim 11 wherein the graphics processor comprises a 3-Dimensional accelerator.

20. The apparatus as recited in claim 11 wherein the accumulators are arranged in an array wherein related parameters are contiguous.

21. A computer-readable medium having computer-executable instructions for performing steps comprising:
   providing image data;
   performing a Hough transform on the image data using a host processor and an operatively configured graphics processor; and,
   causing the graphics processor to perform an alpha-blending operation that selectively increments accumulators that correspond to parameter combinations that are likely associated with an observation.

22. The computer-readable medium as recited in claim 21, having computer-executable instructions that cause the graphics processor to count votes in a resulting Hough transform voting buffer.

23. The computer-readable medium as recited in claim 21, having computer-executable instructions that cause the graphics processor is to convolve image values and provide corresponding results to the host processor.

24. The computer-readable medium as recited in claim 21, having computer-executable instructions that cause the graphics processor to perform a histogram computation to find a maxima value in a Hough transform voting buffer.

25. The computer-readable medium as recited in claim 21 wherein the performing operation comprises template matching.

26. The computer-readable medium as recited in claim 21 wherein the alpha-blending operation adds a tent function to the accumulators, the tent function characterizing errors associated with the observation.

27. The computer-readable medium as recited in claim 21 wherein the alpha-blending operation adds a Gaussian function to the accumulators, the Gaussian function characterizing errors associated with the observation.

28. The computer-readable medium as recited in claim 21 wherein the graphics processor performs the alpha-blending operation on multiple channels in parallel.

29. The computer-readable medium as recited in claim 21 wherein the graphics processor comprises a 3-Dimensional accelerator.

30. The computer-readable medium as recited in claim 21 wherein the accumulators are arranged in an array wherein related parameters are contiguous.

* * * * *